United States Patent [19]

Fick

[11] Patent Number: 4,657,339

[45] Date of Patent: Apr. 14, 1987

[54] FIBER OPTIC SWITCH

[75] Inventor: Franz Fick, Hamburg, Fed. Rep. of Germany

[73] Assignee: U.S. Philips Corporation, New York, N.Y.

[21] Appl. No.: 728,153

[22] Filed: Apr. 30, 1985

Related U.S. Application Data

[63] Continuation of Ser. No. 468,811, Feb. 22, 1983.

[30] Foreign Application Priority Data

Feb. 26, 1982 [DE] Fed. Rep. of Germany ....... 3206919

[51] Int. Cl.⁴ ............................................. G02B 6/36
[52] U.S. Cl. ............................. 350/96.20; 350/96.15
[58] Field of Search ......................... 350/96.15, 96.20

[56] References Cited

U.S. PATENT DOCUMENTS

| | | | |
|---|---|---|---|
| 3,316,800 | 5/1967 | Kibler | 350/96.2 X |
| 3,593,026 | 7/1971 | Uchida | 350/96.20 |
| 4,188,087 | 2/1980 | D'Auria | 350/96.20 |
| 4,220,396 | 9/1980 | Antell | 350/96.15 |
| 4,302,071 | 11/1981 | Winzer | 350/96.20 |
| 4,303,302 | 12/1981 | Ramsey et al. | 350/96.20 |
| 4,307,937 | 12/1981 | Gordon | 350/96.29 |
| 4,318,587 | 3/1982 | Grassl | 350/96.20 |
| 4,385,798 | 5/1983 | Yevick | 350/96.14 |
| 4,410,235 | 10/1983 | Klement et al. | 350/96.18 |
| 4,415,228 | 11/1983 | Stanley | 350/96.20 |
| 4,452,506 | 6/1984 | Reeve et al. | 350/96.20 |
| 4,512,627 | 4/1985 | Archer et al. | 350/96.20 |

FOREIGN PATENT DOCUMENTS

| | | | |
|---|---|---|---|
| 48867 | 4/1982 | European Pat. Off. | 350/96.20 |
| 2918528 | 11/1980 | Fed. Rep. of Germany | 350/96.20 |
| 69105 | 5/1980 | Japan | 350/96.15 |
| 2071924 | 9/1981 | United Kingdom | |

OTHER PUBLICATIONS

Ohmori et al., Applied Optics, vol. 17, No. 22, Nov. 15, 1978, "Optical Fiber Switch Driven by PZT Bimorph," pp. 3531–3532.
Johnson et al., Applied Physics Letters, vol. 31, No. 10, Nov. 15, 1977, "Fiber-Optical Relay," pp. 675–676.
Hale et al., Electronics Letters, vol. 12, No. 15, Jul. 22, 1976, "Mechanical Optical-Fibre Switch," p. 388.

Primary Examiner—William L. Sikes
Assistant Examiner—Frank González
Attorney, Agent, or Firm—Marc D. Schechter

[57] ABSTRACT

A fiber optic switch producing optical connections with very low light losses. The switch has constant mechanical and optical properties over long periods of operation. Adjusting elements act on the end of at least one light conductor to move the end face of the light conductor in the axial and transverse directions. The end face can then be moved opposite to and into contact with the end face of another light conductor.

19 Claims, 6 Drawing Figures

FIBER OPTIC SWITCH

This is a continuation of application Ser. No. 468,811 filed Feb. 22, 1983.

BACKGROUND OF THE INVENTION

The invention relates to a device for optically connecting and disconnecting at least a first and a second light conductor. Each light conductor has an end face. The light conductors are substantially in alignment when connected. At least one conductor has one end on an adjusting member which can be moved between at least two positions. The adjusting member can be moved transverse to the longitudinal axis of the light conductor. The end faces of the first and of the second light conductor are arranged opposite to each other, with a space between the end faces, when the adjusting member is in one of its two positions.

A fiber optic switch having the above construction is known, for example, from German Offenlegungsschrift No. 2,841,848. This Offenlegungsschrift describes, in particular, a switch for connecting or disconnecting at least two light conductors the ends of which extend substantially in the same direction and face each other. Both light conductor ends are provided on a flexible bending member. The end of the first light conductor is connected to the bending member over its full length. The end of the second light conductor, however, engages the bending member loosely.

When the bending member is stretched in a first position, the two end faces of the light conductors are coaxially and opposite to each other and spaced by a small distance. The fibers are then optically connected. When the bending member is in a second, curved position, the end of the second light conductor is pivoted, as a result of which the optical connection is interrupted.

The spacing between the end faces of the two light conductors is necessary so that the end faces of the light conductors do not rub against each other during movement. For producing the optical connection between the two light conductors, however, the spacing between the end faces causes considerable light losses in the coupling of the light from one of the light conductors to the other.

It is known to reduce such light losses by providing an immersion liquid between the end faces of the light conductors. The use of an immersion liquid, for example glycerine or benzene, disadvantageously results in contamination of the device. Also, the liquid may evaporate or dry up so that the device becomes useless.

SUMMARY OF THE INVENTION

It is an object of the invention to provide a fiber optic switch which produces an optical connection with only very small light losses, which does not wear down the end faces of the light conductors due to rubbing during switching, which has constant mechanical and optical properties over long periods in operation, and which consequently is reliable in operation.

According to the invention this object is achieved by providing a fiber optic switch with axial adjusting elements. The adjusting elements move the end faces of the two light conductors relative to each other in the axial direction such that the opposite end faces of the light conductors contact each other. Such a device is advantageous because when the ends of the light conductors are moved transverse to each other, there is a sufficiently large air gap between the end faces that they do not rub. When light is transmitted through the light conductors, the air gap is minimized so that light losses are very small. An immersion liquid is not necessary in contrast with the known devices.

According to an advantageous modified embodiment of the invention the axial adjusting elements comprise at least one piezoelectric transducer to which an electric voltage can be applied. Piezoelectric adjusting elements have very short switching times because of their small mass and high adjusting forces.

According to another embodiment of the invention, at least one transverse adjusting element is provided for transversely moving the adjusting member. At least one axial adjusting element is connected to the adjusting member to axially move the adjusting member. Such a combination provides a compact construction and immediate axial and transverse adjustment of the adjusting member and hence of the light conductor and provided thereon.

When applying an electric voltage to a piezoelectric member, its dimensions vary parallel and at right angles to the direction of the electric field generated by the voltage. These phenomena are known as the longitudinal and transverse piezoelectric effects, respectively. The values of the variations in the dimensions depend on the nature and composition of the piezoelectric material, as well as, in technically manufactured piezoelectric ceramic materials, on the strength and direction of the electric polarization artificially impressed on the material with respect to the applied electrical field.

When an electric field parallel to and in the same direction as the electric polarization impressed on the material is applied to a piezoelectric ceramic material, for example a piezoxide (PXE), the material contracts in the direction of the field and simultaneously expands at right angles to the direction of the field. In contrast, when the electric field is applied parallel but opposite to the electric polarization, the material expands in the direction of the field and simultaneously contracts at right angles to the direction of the field.

Depending on the geometry of the piezoelectric ceramic member, its polarization and the arrangement of electrodes thereon, piezoelectric transducers can be manufactured having different properties. Those properties which are most important for the invention will be briefly explained below.

In one type of piezoelectric transducer, a homogeneous polarization is impressed upon the material. The electrodes are arranged at right angles to or parallel to the direction of polarization. Preferably the longitudinal piezoelectric effect (i.e. a variation in the length parallel to the direction of polarization and the direction of the applied electric field) is used to move the adjusting member. Transducers of this type are usually in the form of a disc or plate, are polarized parallel to the small dimension of the plate or disc, and are provided with electrodes on their large surfaces. In order to increase the adjusting stroke with the same voltage at the electrodes, several discs or plates can be stacked with their large surfaces adjacent. Individual elements of the stack are connected electrically in parallel and mechanically in series.

According to an advantageous embodiment of the invention, at least one of the adjusting elements is formed from at least one piezoelectric member in the form of a disc or plate. Such an adjusting element is mechanically very stable and hence insensitive to vibrations or deformations. As a result, such an adjusting element performs sure and accurate adjusting movements and produces high adjusting forces.

In another type of piezoelectric tranducer, the piezoelectric material is subdivided into tow areas of opposite polarization. Upon applying an electric field parallel to the directions of polarization, the piezoelectric member bends (in a manner comparable to a bimetallic strip) due to the different variations in the lengths of the oppositely polarized areas. To produce a large curvature, such piezoelectric transducers have a large dimension along the curving surfaces of the body. These transducers are preferably in the form of a rod or a strip.

According to another advantageous embodiment of the invention, at least one of the adjusting elements is a piezoelectric bending beam. Such bending beams have a simple construction and a large stroke during the adjusting movement.

According to a further embodiment of the invention, at least one transverse adjusting element is a piezoelectric bending beam, and at least one axial adjusting element is at least one piezoelectric member in the form of a disc or plate. Such a combination of the various adjusting elements achieves a large transverse stroke, and a large, accurate axial stroke with a compact adjusting element.

A particular embodiment of a piezoelectric "bending beam" is the multimorphous strip which is extruded from a piezoelectric ceramic material. The multimorphous strip has a cross-section in the form of a flat rectangle having rounded-off sides and several cylindrical longitudinal ducts arranged on an axis parallel to the length of the strip. The outer face and the surfaces of the longitudinal ducts are coated with metallizations.

The material of the multimorphous strip is polarized by applying an electric voltage between the metallization of the outer face of the strip and the metallization of the surfaces of the ducts. The polarization in the area above the longitudinal ducts is directed opposite to the polarization in the area below the longitudinal ducts. When an electric field is applied to the polarized strip parallel to the direction of polarization, the longitudinal axis of the strip will curve due to the transverse piezoelectric effect.

When, on the other hand, the strip is polarized in the same direction both above and below the longitudinal ducts, the length of the longitudinal axis changes uniformly without bending upon applying an electric field parallel to the polarization. for the device according to the invention, piezoelectric transducers may be used individually or in combination.

In another embodiment of the invention, the adjusting member with the transverse and axial adjusting elements consists of a piezoelectric member in the form of a rod or strip. As a result, a simple mechanical construction is obtained.

In a further embodiment of the invention, the piezoelectric member comprises several areas of different piezoelectric properties. At least one area is a transverse adjusting element and at least one other area is an axial adjusting element.

In a particularly simple construction according to the invention, the piezoelectric member is a multimorphous strip. The electric polarization of the axial adjusting element is uniform. In the transverse adjusting element, the piezoelectric member comprises two layers of opposite electric polarization. In order to obtain a large transverse stroke, it is advantageous for one of the ends of the piezoelectric member to be rigidly connected to a housing.

In order to produce a simple construction, electrodes are provided on the piezoelectric member, the electric polarization of the piezoelectric member extends substantially perpendicular to its longitudinal axis, the electrodes are planar and at right angles to the polarization, and the layers of opposite polarization extend substantially parallel to the electrodes.

For fiber-optic switches having several parallel light conductors, for example with separate light conductors for each direction of transmission or for increasing the transmission capacity, in another embodiment of the invention at least two light conductors are arranged parallel to each other on the adjusting member.

Preferably, the ends of the light conductors are arranged in the longitudinal ducts of the multimorphous strip adjusting member. In this construction, the light conductors are protected from pollution and mechanical load. The transverse adjusting forces advantageously act on the entire end of the light conductor present in the multimorphous strip.

In a further embodiment of the invention, at least one switching position is defined by a guide element, in particular an abutment. As a result, the axes of the light conductors to be optically connected accurately aligned so that the attenuation of the light transmitted is minimum.

A guide element which is particularly simple to manufacture is formed by the holder of at least one light conductor end. At least one light conductor provided on the adjusting member bears on the holder in at least one switching position. The surfaces of the light conductors to be optically connected are aligned relative to each other by this guide element. The attenuation of the transmitted light depends only on the dimensional tolerances of the light conductors.

In order to ensure that the light conductors are in accurate alignment (to minimize that attenuation), according to a further embodiment of the invention the switching arrangement comprises a control stage. The central stage is connected to the adjusting elements and generates actuating signals for the adjusting elements so that the adjusting member is aligned to minimize the attenuation. The switching arrangement finely adjusts the light conductors' ends relative to each other before their end faces are pressed into contact with each other by the axial adjusting elements so as to produce the optical connection.

Such an accurate adjustment of the light conductors' ends is useful when the attenuation of the transmitted light is to minimized by joining together the opposite end faces of the light conductors. For that purpose, the light conductors may be connected to a light transmitter and a light receiver, respectively. The switching arrangement measures the amount of light transmitted between the ends of the two light conductors. The position of at least one of the light conductors is then adjusted by varying the electric voltage on at least one of the adjusting elements. The position is adjusted until the light transmitted via the two light conductors to the receiver is maximized.

According to another embodiment of the invention, a light receiver is connected to the switching arrangement near the end faces of at least two light conductors. The end faces of the two conductors are opposite to each other in at least one position. The switching arrangement measures stray light at the opposite light conductor ends, and adjusts the position of at least one of the light conductors to minimize the stray light. This construction is advantageous because all switchable light conductor connections can be used for transmitting signals. Not one connection is used for performing the switching operation.

Moreover, the switching arrangement advantageously compensates for thermal expansion in the device. Disadjustment of the end faces of the light conductors relative to each other produced by thermal expansion is compensated by the switching arrangement by automatic tracking of the adjusting member. No mechanical detrition occurs since no mechanical guiding elements are present at which friction can occur.

DESCRIPTION OF THE PREFERRED EMBODIMENTS

Figure 1:
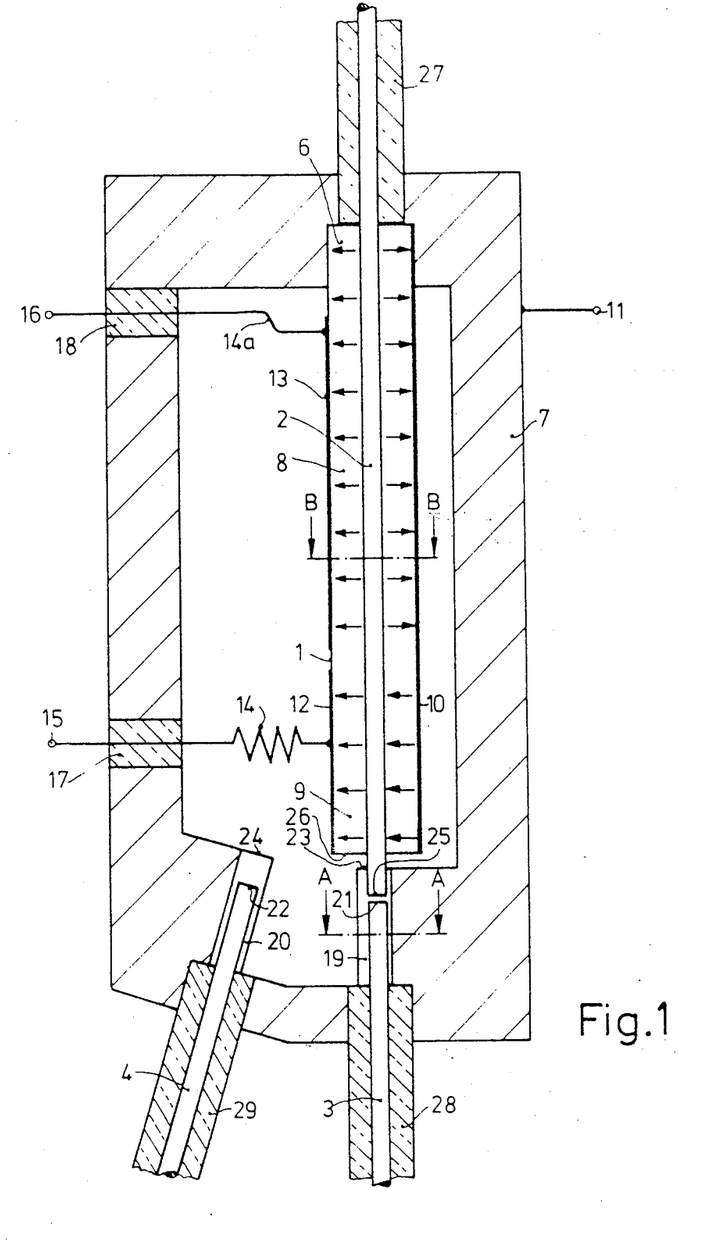
FIG. 1 is a partly longitudinal sectional view and partly schematic view of an embodiment of a light conductor switch.
Figure 2:
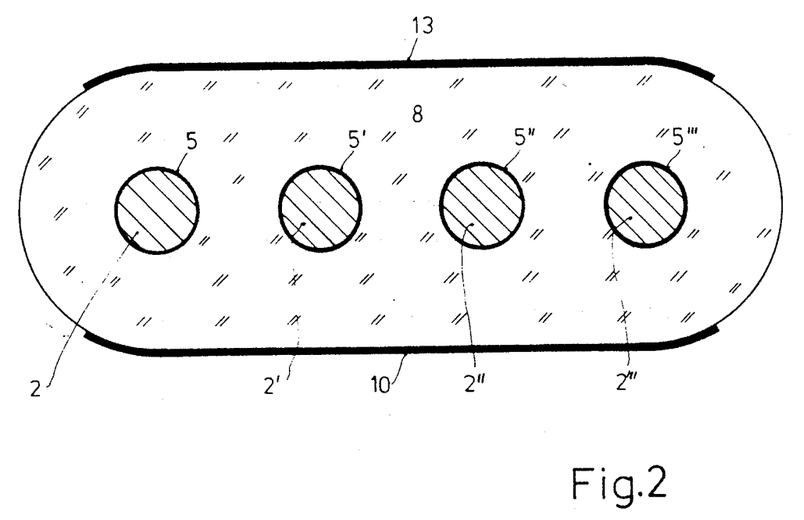
FIG. 2 is a sectional view on line B—B of FIG. 1 through a multimorphous strip forming an adjusting member.

Referring to FIGS. 1 and 2, the fiber optic switch includes an adjusting member 1 in which four light conductors 2, 2', 2" and 2''' are arranged. In a first switching position (shown), the conductors are opposite to a first group of light conductors 3 rigidly connected to housing 7. In a second switching position, the conductors are opposite to a second group of light conductors 4 also rigidly connected to housing 7.

In the present example, the adjusting member 1 consists of a multimorphous strip having four longitudinal ducts. The walls of the ducts are provided with conductive coatings 5, 5', 5" and 5'''. The light conductors 2, 2', 2" and 2''' preferably optical fibers, are arranged in the ducts. One end 6 of the multimorphous strip is rigidly connected to housing 7.

The length of the multimorphous strip 1 is divided into two sections 8 and 9. In the first section 8, attached to the housing 7, the multimorphous strip has two layers of opposite electrical polarization. The directions of the electrical polarizations are indicated by arrows. The arrows point away from the longitudinal ducts. The section 8 of strip 1 is a piezoelectric bending beam and forms the transverse adjusting element.

The second section 9 of the multimorphous strip is polarized in a single direction from the lower side to the upper side of strip 1. Section 9 of strip 1 forms the axial adjusting element.

The lower side of the multimorphous strip is coated with a metallization 10. Metallization 10 extends over both sections 8 and 9, and serves as an electrode. Metallization 10 is connected via the housing 7 to an electric connection terminal 11.

The upper side of the multimorphous strip 1 has an electrode metallization 13 on the transverse adjusting element 8. An electrode metallization 12 is provided on the axial adjusting element 9. The electrode 12 of the axial adjusting element 9 is connected to a connection terminal 15 by a flexible electric conductor 14 which is capable of following the movement of the multimorphous strip 1. The electrode 13 of the transverse adjusting element 8 is connected to a connection terminal 16 via a flexible electric conductor 14a. As compared with the conductor 14, conductor 14a will be subjected to less movement. The connection terminals 15 and 16 are provided in insulating leadthroughs 17 and 18, respectively.

Figure 3:
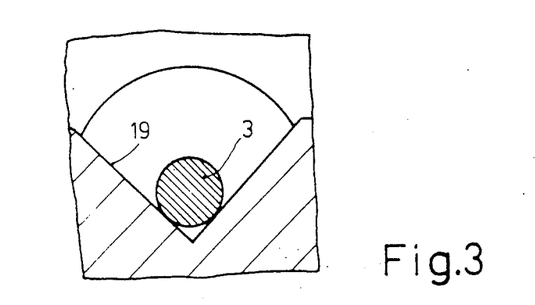
FIG. 3 is a sectional view on line A—A of FIG. 1 through a holder of a light conductor end.

FIG. 3 is a sectional view on the line A—A of FIG. 1 through the end of one of the light conductors 3 and through the holder on which the light conductor 3 is accommodated. In the present example, four such holders are provided adjacent each other for four light conductors 3 such that each end face 21 of a light conductor 3 is opposite to an end face 25 of one of the four light conductors 2, 2', 2" and 2''', in the first switching position. In the same manner, the holders of the four light conductors 4 (the end faces 22 of which are opposite to the end faces 25 of the light conductors 2, 2', 2" and 2''' in the second switching position, are provided spaced from the holders of the light conductor 3.

The end of the fixed light conductor 3 and 4 (which are also optical fibers) are accommodated in triangular grooves 19 and 20, respectively, in the housing 7. The walls of each groove 19 and 20 preferably intersect at a right angle. As a result, the position of the light conducting fiber in the groove can be fixed as accurately as possible.

The fixed fibers 3 and 4 end at a short distance from the ends 23 and 24 of the grooves 19 and 20. As a result, the ends 23 and 24 of the grooves 19 and 20 remain unoccupied. These ends form guide elements for the ends of the fibers 2, 2', 2" and 2''', which project a small distance beyond the end face 26 of the multimorphous strip 1.

In each of the first and second switching positions, the ends of the fibers 2, 2', 2" and 2''' and 3, and 2, 2', 2" and 2''' and 4, respectively, are arranged in the grooves 19 and 20, respectively, so as to be in exact alignment and facing each other. The end faces 25 of the fibers 2, 2', 2" and 2''' flatly engage the end faces 21 and 22 of the fibers 3 and 4, respectively.

The light conducting fibers 2, 2', 2" and 2''', 3 and 4 are covered with flexible protective envelopes 27, 28 and 29, respectively. For strain relief, the protective envelopes are connected to the holder 7.

For operating the switch shown in FIG. 1 to move strip 1 from the first switching position (in which the light conductors 2, 2', 2", and 2''' are connected to the light conductors 3) into the second switching position (in which the light conductors 2, 2', 2" and 2''' are connected to the light conductor 4), a positive voltage (with respect to the terminal 11) is applied to the terminal 15. As a result, the axial adjusting element 9 is shortened in the longitudinal direction of the fibers 2, 2', 2" and 2'''. The end faces 25 of these fibers retract from the end faces 21 of the fibers 3. This position is shown in FIG. 1.

By subsequently applying a positive voltage to the terminal 16, the transverse adjusting element 8 is curved until the ends of the fibers 2, 2', 2" and 2''' engage the grooves 20. Then, the voltage at the terminal 15 is reduced to zero. As a result, the end face 25 of the fibers 2, 2', 2" and 2'" engage the end faces 22 of the fibers 4, to produce optical contacts between the fibers. The positive voltage at the terminal 16 remains switched on as long as the optical contacts between the fibers 2, 2', 2" and 2'" and the fibers 4 are to be maintained. For switching back to the original switching position, all steps are to be performed in the reverse sequence.

The device shown in FIG. 1 can be inserted into a hermetically sealed housing which may comprise a protective gas. As a result, the switch is protected against corrosion and pollution.

Figure 4:
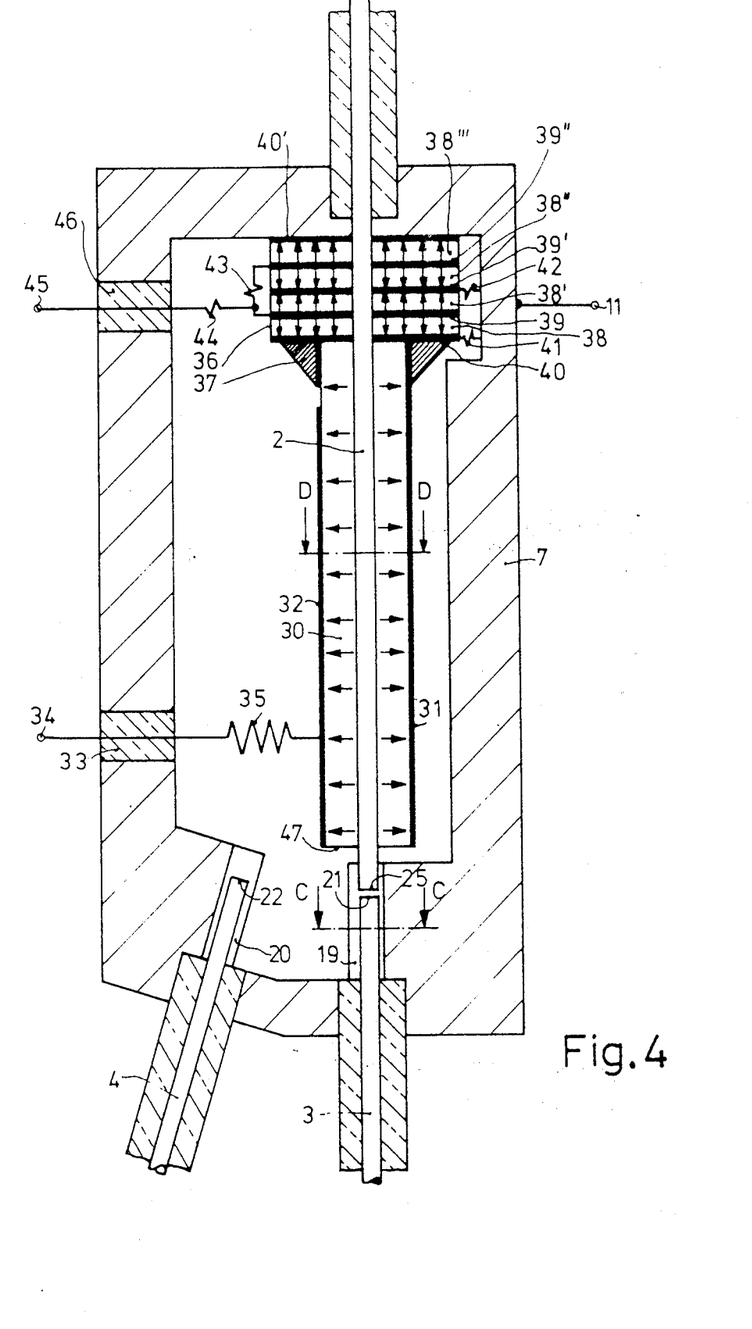
FIG. 4 is a partly cross-sectional, partly schematic representation of another embodiment of a light conductor switch.

FIG. 4 shows a second embodiment of the invention having an adjusting member comprising two separate adjusting elements. Otherwise the switch is the same as the switch shown in FIG. 1. In the FIG. 4 switch, as contrasted with the FIG. 1 switch, the axial adjusting element is not arranged near the end faces 25 of the light conductors 2, 2', 2", and 2'", but is instead arranged remote from the end faces 25. The axial movement is transmitted to the end faces 25 by the transverse adjusting element 30.

The transverse adjusting element 30 is a multimorphous strip bending beam having the same structure as the multimorphous strip of FIG. 1. The cross-sectional view on line D—D of FIG. 4 through the multimorphous strip 30 is identical to the cross-section view on line B—B of FIG. 1, and is therefore also shown in FIG. 2. An electrode metallization 31 is provided on the lower side of the multimorphous strip 30 and a control electrode metallization 32 is provided on the upper side.

The control electrode 32 is connected to a connection terminal 34 via a flexible conductor 35. Terminal 34 is provided in an insulating leadthrough 33 in the housing 7.

The multimorphous strip 30 is connected to a stack 36 of four piezoelectric transducers plates 38, 38', 38", and 38'" by a solder joint 37. The transducer stack 36 forms the axial adjusting element. Between adjacent piezoelectric transducers 38, 38', 38" and 38'" a metal layer 39, 39' or 39" forms an electrode. The end faces of the transducer stack 36 are each also covered with a metal electrode 40 and 40'.

The electrodes 40 and 39' are connected via flexible conductors 41 and 42 to housing 7. The electrode 40' is connected directly to the housing 7. Hence, electrodes 40, 40' and 39' are connected to the terminal 11. As a result of the solder joint 37, the electrodes 40 and the flexible conductor 41, the electrode 31 of the multimorphous strip 30 is also connected to housing 7 (defined as ground potential).

The electrodes 39 and 39" are connected together via flexible conductors 43 and 44 and to the connection terminal 45. Terminal 45 is provided in the housing in an insulating leadthrough 46.

For lifting the end faces 25 of the light conductors 2, 2', 2" and 2'" from the end faces 21 and 22, respectively, of the fixed light conductors 3 and 4, respectively, a positive electric voltage (positive with respect to housing 7) is applied to the terminal 45. As a result, the axial adjusting element 36 contracts parallel to the longitudinal axis of the light conductor 2. For swinging the end faces 25 of the light conductors 2, 2', 2" and 2'" from their first switching positions (in front of the end faces 21 of the light conductors 3) into their second switching position (in front of the end faces 22 of the light conductors 4), a positive voltage is applied to the terminal 34.

The holders 19 and 20 for the fixed light conductors 3 and 4, and the guide elements for the ends of the light conductors 2, 2', 2" and 2'" are all constructed as in the FIG. 1 device Accordingly, FIG. 3 also shows a sectional view on the line C—C in FIG. 4.

The light conductors 2, 2', 2" and 2'" are fastened in the multimorphous strips 1 and 30 preferably by means of an adhesive. The adhesive is applied to a short section of the light conductor near the end face 26 or 47 of the multimorphous strip 1 or 30, respectively. Only light conductors which are as deformable as the piezoelectric transducers are connected throughout the multimorphous strips 1 and 30. Light conductors of slightly deformable material are arranged in the adjusting elements and the adjusting member so as to be axially movable up to the spot of adhesion. The length compensation for the axial movement of the light conductor is achieved, for example by providing a loop of the light conductor behind the switch. The light conductors are journalled flexibly in the area of said bend.

In order to limit forces which may occur due to the axial adjusting movement, the adjusting member may advantageously be supported in a resilient manner in the axial direction. For that purpose, for example, in the FIG. 1 device the end 6 of the multimorphous strip 1 may be supported on the housing 7 in the axial direction by a flexible element, for example a rubber padding. In the FIG. 4 device, for example, a rubber disc may be inserted between the electrode 40' and the housing 7 parallel to the face of the electrode 40'.

Figure 5:
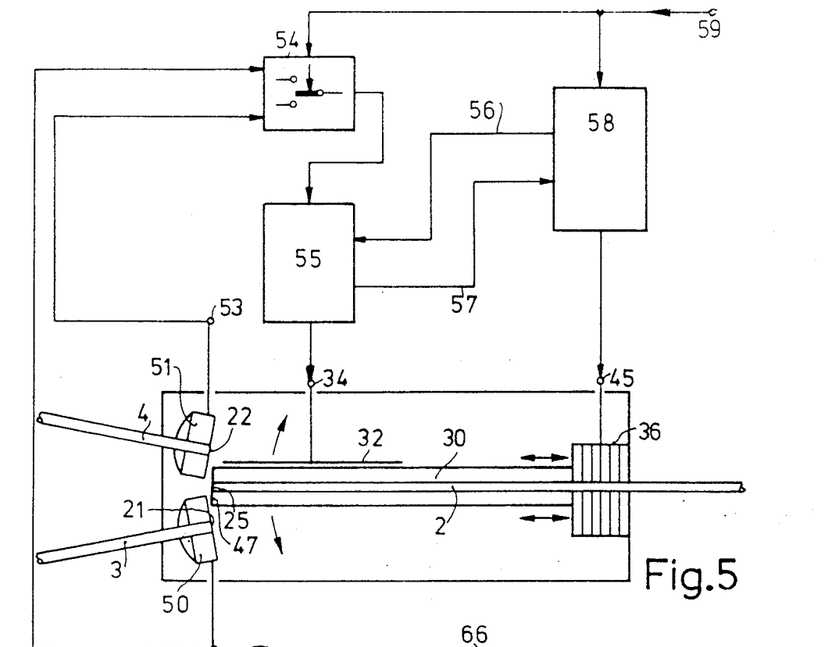
FIG. 5 is a block diagram of a circuit arrangement for adjusting the light conductor ends relative to each other.

FIG. 5 shows a block diagram of a switching arrangement for adjusting the position of the end of a light conductor in a switch constructed according to FIG. 4 (or FIG. 1). In FIG. 5, the transverse adjusting element 30 is in a central position (i.e. during the second switching step) between the first and second switching positions. The light signal to be switched, in the embodiment described here, is received through the light conductor 2 arranged on the adjusting member. This signal is selectively fed to the fixed light conductor 3 or 4. If the light conductor 2 is not aligned with one of the two light conductors 3 or 4, at least part of the light emanating from the end face 25 of the light conductor 2 is not incident on the end face 21 of the light conductor 3 or the end face 22 of the light conductor 4, respectively.

Adjacent the ends of the light conductors 3 and 4, light sensors 50 and 51, respectively are provided. Sensors 50 and 51 have light-sensitive faces which are aligned parallel to the end faces 21 and 22 of the light conductors 3 and 4, respectively. The output terminals 52 and 53 of the light sensors 50 and 51 are connected to a switching stage 54. Switching stage 54 connects one of the light sensors 50 or 51 to a control stage 55.

Control stage 55 is connected to the terminal 34 of the electrode 32 of the transverse adjusting element 30. Furthermore, the control stage is also connected, via a control line 56 and a return line 57 to a control circuit 58. An output of the control circuit 58 is connected to the terminal 45 of the axial adjusting element 36. An input terminal of the switching stage 54 and an input terminal of the control circuit 58 are connected to a switching signal input 59.

The properties and functions of the switching arrangement will be explained with reference to the following example of a switching process. A voltage with a given time variation or level is applied to the switching signal input 59. As a result of this switching signal, the switching stage 54 connects the light sensor 51 to the control stage 55. (We are assuming that the light conductor 2 is initially connected to the light conductor 3. In its final position, conductor 2 will be connected to the light conductor 4.) At the same time, the switching signal applied to the switching signal input 59 triggers a process control in the control circuit 58. In the first step of the process, control circuit 58 lifts the end face 25 of the light conductor 2 from the end face 21 of the light conductor 3 by applying a voltage to the terminal 45 of the axial adjusting element 36.

In the second step, the control circuit 58 gives an order via the control line 56 to the control stage 55. Stage 55 then applies a voltage to the terminal 34 of the transverse adjusting element 30 to move the end of the light conductor 2 from the end of the light conductor 3 to the end of the light conductor 4. The control stage 55 moves the end face 25 of the light conductor 2 by varying the voltage at the terminal 34 until the stray light radiated from the light conductor 2 and received by the light sensor 51 is minimized. The end of the alignment process is signalled to the control circuit 58 by the control stage 55 by a return signal on the return ling 57.

The control signal 58 then switches off the voltage at the connection terminal 45 of the axial adjusting element 36. As a result, the end face 25 of the light conductor 2 engages the end face 22 of the light conductor 4 in sharp alignment and thus produces an optical connection with minimum attenuation. The movement of the adjusting elements 30 is shown in FIG. 5 with single arrows. The movement of adjusting element 36 is shown with double arrows.

Figure 6:
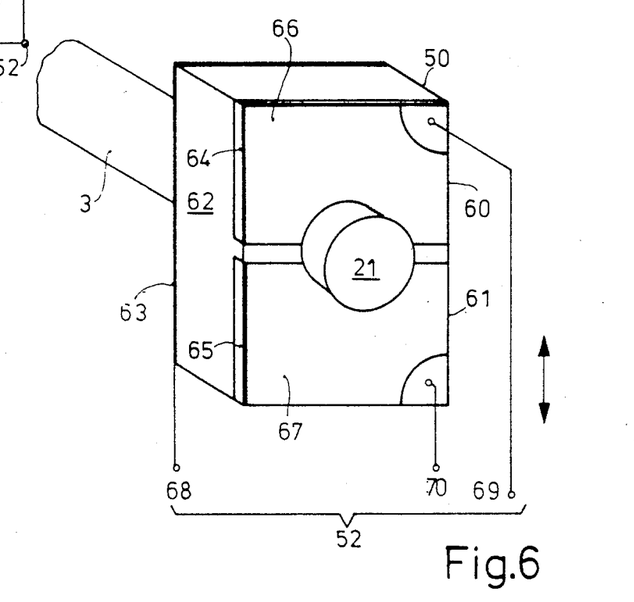
FIG. 6 is a schematic representation of a light receiver for receiving stray light.

FIG. 6 shows a light sensor from the switching arrangement shown in FIG. 5. The light sensor 50 consists of two semiconductor photodiodes 60 and 61. Photodiodes 60 and 61 are arranged sequentially in the direction of the transverse adjusting movement of the transverse adjusting element.

The semiconductor consists, for example, of a substrate zone 62 of n-type silicon. On the rear side of substrate 62 is a cathode metallization 63. On the front side of the semiconductor are two p-conductive areas 64 and 65 which are coated with transparent anode electrodes 66 and 67. Contacts 68, 69 and 70 are connected to the cathode and the anodes and are connected to the switching stage 54 via the connection 52.

At the boundary between the two photodiodes 60 and 61, the semiconductor has an interruption through which the end of the light conductor 3 is arranged. The end face 21 of the light conductor 3 if provided on the side of the anodes. Depending upon whether the end face 25 of the light conductor 2 is higher or lower than the end face 21 of the light conductor 3, the light emanating from the light conductor 2 will impinge upon the photodiode 60 or 61. Accordingly, an electric signal is present at the contact 69 or 70 and is evaluated by the control stage 55.

Since in contrast with the devices described in FIGS. 1 and 4 no mechanical guiding element is necessary with the arrangement of FIG. 5, the end face 25 of the light conductor 2 is a preferably provided flush with the end face of the guide member (i.e. as shown in FIG. 5, even with the end face 47 of the transverse adjusting element 30). Whereas, when a mechanical guide elements is used, the alignment depends on physical contact between the end of conductor 2 with the guide, the FIG. 5 arrangement is free from mechanical friction. Hence, the FIG. 5 arrangement is extremely low in detrition, is robust and ensures vibration-free operation.

The housing 7 is preferably a material having small thermal expansion, for example Invar steel. Other preferred materials are copper alloys whose coefficients of expansion correspond to that of the light conductor materials used. The device may then also be used with larger fluctuations of the operating temperature. In this respect, the switching arrangement shown in FIG. 5 automatically compensates for thermal expansions in the device.

Various modifications of the described embodiments are possible. In one modification the axial and transverse adjusting elements may be magnetic drives by which adjusting movements with large strokes can be achieved in a simple manner. Piezoelectric transducers on the other hand have the advantage of a smaller and lighter construction as well as a negligibly small consumption of energy. Moreover, piezoelectric transducers cannot be influenced by magnetic fields.

In another embodiment of the invention, at least one of the adjusting elements is a thermally operated expansion member. Axial and transverse adjusting elements of a simple construction and occupying little room can be manufactured with thermally operated expansion members, but only devices in which comparatively large switching times are permitted are advantageously provided with these adjusting elements.

What is claimed is:

1. A fiber optic switch for optically connecting and disconnecting a first and a second light conductor, said first conductor having an axis, said switch comprising:
    a transverse adjusting element for moving an end of the first conductor transverse to the conductor axis between first and second fixed transverse switch positions; and
    an axial adjusting element for moving the end of the first conductor in the direction of the conductor axis between first and second fixed axial switch positions;
    characterized in that:
    the transverse adjusting element and the axial adjusting element are separately actuable such that the end of the first conductor can be moved transversely without being moved axially, and the end of the first conductor can be moved axially without being moved transversely; and
    the axial adjusting element moves the end of the conductor by expanding or contracting substantially uniformly in the direction of the conductor axis.

2. A fiber optic switch as claimed in claim 1, characterized in that the axial adjusting element comprises a piezoelectric transducer.

3. A fiber optic switch as claimed in claim 2, characterized in that the transverse adjusting element and the axial adjusting element are combined with one another to form an adjusting member.

4. A fiber optic switch as claimed in claim 3, characterized in that the transverse adjusting element is a piezoelectric bending beam.

5. A fiber optic switch as claimed in claim 3, characterized in that the transverse adjusting element is a piezoelectric disc.

6. A fiber optic switch as claimed in claim 3, characterized in that the transverse adjusting element is a piezoelectric plate.

7. A fiber optic switch as claimed in claim 3, characterized in that the axial adjusting element is a piezoelectric disc.

8. A fiber optic switch as claimed in claim 3, characterized in that the axial adjusting element is a piezoelectric plate.

9. A fiber optic switch as claimed in claim 3, characterized in that the adjusting member is a piezoelectric multimorphous strip.

10. A fiber optic switch as claimed in claim 9, characterized in that the adjusting member has an end rigidly connected to a housing.

11. A fiber optic switch as claimed in claim 10, characterized in that:
the axial adjusting element comprises a uniformly polarized piezoelectric material; and
the transverse adjusting element comprises a piezoelectric member having two oppositely polarized layers.

12. A fiber optic switch as claimed in claim 11, characterized in that the piezoelectric member is provided with planar electrodes perpendicular to the polarization of the member but parallel to the layers thereof.

13. A fiber optic switch as claimed in claim 3, characterized in that the adjusting member accommodates ends of two or more light conductors.

14. A fiber optic switch as claimed in claim 13, characterized in that the light conductors are arranged in longitudinal ducts in the adjusting member.

15. A fiber optic switch as claimed in claim 14, characterized in that the adjusting member is movable between first and second switch positions, and is aligned in one or both positions by an abutment.

16. A fiber optic switch as claimed in claim 15, characterized in that the abutment is formed by a holder of the second light conductor.

17. A fiber optic switch as claimed in claim 1, characterized in that the switch further comprises a control stage for generating actuating signals for the adjusting elements to align the first light conductor at the switch positions.

18. A fiber optic switch as claimed in claim 17, characterized in that the switch further comprises a light receiver arranged at each switch position, the outputs of the light receivers being input into the control stage, the control stage actuating the adjusting element to minimize the light received by the receivers.

19. A fiber optic switch for optically connecting and disconnecting a first and a second light conductor, said first conductor having an axis, said switch comprising:
a transverse adjusting element for moving an end of the first conductor transverse to the conductor axis between first and second fixed transverse switch positions; and
an axial adjusting element for moving the end of the first conductor in the direction of the conductor axis between first and second fixed axial switch positions;
characterized in that:
the transverse adjusting element and the axial adjusting element are separately actuable such that the end of the first conductor can be moved transversely at any axial position without being moved axially, and the end of the first conductor can be moved axially at any transverse position without being moved transversely; and
the axial adjusting element moves the end of the conductor by expanding or contracting substantially uniformly in the direction of the conductor axis.

* * * * *